(12) United States Patent
Huang et al.

(10) Patent No.: US 8,000,071 B2
(45) Date of Patent: Aug. 16, 2011

(54) APPARATUS AND METHOD FOR REDUCING THE DIE AREA OF A PWM CONTROLLER

(75) Inventors: Pei-Lun Huang, Longtan Shiang (TW); Cheng-Hsuan Fan, Hukou Shiang (TW)

(73) Assignee: Richtek Technology Corp., Hsinchu (TW)

( * ) Notice: Subject to any disclaimer, the term of this patent is extended or adjusted under 35 U.S.C. 154(b) by 519 days.

(21) Appl. No.: 12/155,023

(22) Filed: May 29, 2008

(65) Prior Publication Data

US 2008/0298099 A1 Dec. 4, 2008

(30) Foreign Application Priority Data

Jun. 1, 2007 (TW) .............................. 96119818 A

(51) Int. Cl.
*H02H 7/12* (2006.01)

(52) U.S. Cl. ........................................... 361/84; 363/50
(58) Field of Classification Search ................... 361/86; 363/50, 21.16, 97
See application file for complete search history.

(56) References Cited

U.S. PATENT DOCUMENTS

| 7,764,521 B2 * | 7/2010 | Lin et al. ............... 363/21.16 |
| 2008/0298099 A1 * | 12/2008 | Huang et al. ............. 363/50 |

* cited by examiner

*Primary Examiner* — Jared J Fureman
*Assistant Examiner* — Angela Brooks
(74) *Attorney, Agent, or Firm* — Rosenberg, Klein & Lee

(57) ABSTRACT

An apparatus and method for reducing the die area of a PWM controller include a protection circuit triggered by a fault index signal for counting, and the counting time is provided for a delay time required by fault verification. Therefore, fault detection circuits can be eliminated and the purpose of reducing the die area can be achieved.

5 Claims, 8 Drawing Sheets

APPARATUS AND METHOD FOR REDUCING THE DIE AREA OF A PWM CONTROLLER

FIELD OF THE INVENTION

The present invention is related generally to a pulse width modulation (PWM) controller and, more particularly, to an apparatus and method for reducing the die area of a PWM controller.

BACKGROUND OF THE INVENTION

For standing out in the highly competitive market, better function and lower cost are two key factors for integrated circuit (IC) products. However, better function generally means more complex circuit and larger die area, and thereby higher cost. As shown in FIG. 1, a flyback converter 100 uses a PWM controller 180 to operate it in constant frequency current mode and processing the line voltage VIN into an isolated direct current (DC) output voltage VOUT. The PWM controller 180 provides a PWM signal $S_D$ for a power stage 110, and a feedback circuit 150 generates a feedback signal $S_{fb}$ for the PWM controller 180 according to the output voltage VOUT in order to regulate the output voltage VOUT within an adjustable range. In the power stage 110, the input voltage VIN is coupled to a primary coil 116 of a transformer 114, power is delivered to a secondary coil 118 of the transformer 114 by using the PWM signal $S_D$ to switch a switch 120 coupled between the primary coil 116 and a ground terminal GND, to charge a capacitor 126 to generate the output voltage VOUT, and a resistor 122 is coupled between the switch 120 and the ground terminal GND to generate a current sense signal $S_{cs}$ that is fed back to a current sense pin CS of the PWM controller 180. The PWM controller 180 modulates the duty cycle of the switch 120 with the PWM signal $S_D$, and accordingly regulates the output voltage VOUT. FIG. 2 depicts a portion of the circuit inside the PWM controller 180, in which a feedback compensation signal $S_{comp}$ is generated from the feedback signal $S_{fb}$ provided by the feedback pin FB, a leading edge blanking (LEB) signal $S_{LEB}$ is generated from the current sense signal $S_{cs}$ provided by the current sense pin CS, an oscillator 210 provides a clock 212, a maximum duty limit DMAXB and a current limiting signal 218, a comparator 220 generates a current comparator output CCO by comparing the feedback compensation signal $S_{comp}$ and LEB signal $S_{LEB}$, a comparator 222 generates a current limiting output CLO by comparing the LEB signal $S_{LEB}$ and current limiting signal 218, an OR gate 224 generates a reset signal R for a latch 226 according to the signals CCO and CLO, the set input S of the latch 226 receives the clock 212, and an AND gate 228 determines the PWM signal $S_D$ according to the maximum duty limit DMAXB and the output Q of the latch 226.

Referring back to FIG. 1, for the purpose of meeting electromagnetic interference (EMI) requirements, an EMI filter will be needed in the front of the input VIN to filter out EMI noise, thereby increasing the size and cost of the flyback converter 100. The size of an EMI filter increases with the increasing of the EMI noise to be filtered out. Frequency jittering is the trend in the latest AC/DC converter because it saves the cost in EMI filtering. Generally, the jitter function is implemented by logic circuit with counter. For example, U.S. Pat. No. 6,249,876 to Balakrishnan, et al. describes a digital frequency jittering circuit using a counter to generate a low-frequency envelope. To modulate a switching frequency, such as 67 KHz or 134 KHz in a low-frequency envelop, such as 4 ms period, a big counter is needed. As is well known, counter is made of T flip-flop which is a very die area consuming component. Typically, a T flip-flop costs the same area as a 5 pF capacitor, and a big counter consumes relatively large die area accordingly. Analog frequency jittering circuit generates a low frequency envelop by charging a large capacitor with a small current and therefore, it also consumes a relatively large die area. Though frequency jittering facilitates reducing the size of EMI filter, it disadvantageously bulks the size of a PWM controller.

On the other hand, some more circuits may be equipped to a PWM controller for various functions. For example, a deglitch circuit may be provided for preventing a flyback converter from malfunction caused by noise, and a soft-start circuit may be for protecting a flyback converter from being damaged by over current during power-on. These circuits significantly increase the die area and cost of a PWM controller. U.S. Pat. Nos. 6,107,851 and 6,229,366 to Balakrishnan, et al. integrate the soft-start and frequency jittering of a PWM controller into a circuit for the purpose of reducing the die area and cost of the PWM controller. However, a PWM controller may include some other functions which take long time for event verification, for example the detections of overload, light load, feedback open, optocoupler short or brownout. It is very area consuming to generate a long time constant in an IC. Consequently, reducing the die area of a PWM controller is limited.

As a remedy, a PWM controller having a shared frequency jittering circuit uses a low-frequency envelop generated by the frequency jittering circuit to provide a long time for the circuit that requires long time for operation or verification, to save the die area for RC circuit. As shown in FIG. 3, in a PWM controller 300 using a digital frequency jittering circuit, for a feedback open detector 310, an overload detector 312, a brownout detector 314, an optocoupler short detector 316 and an oscillator 322 to share a main counter 324, a clock diverting circuit 320 selects one from the outputs of the above circuits as the input clock of the main counter 324. In normal operation, the main counter 324 counts the clock provided by the oscillator 322 to trigger a frequency jittering 328 and a soft-start timer 330. When any one of the feedback open detector 310, overload detector 312, brownout detector 314 and optocoupler short detector 316 detects a fault, the detection signal generated therefrom possesses the highest priority to be the input of the main counter 324. Thus, the main counter 324 takes the detection signal as the clock for counting, and a sub counter 326 acts as a downstream of the main counter 324 for increasing the counting time so as to substitute an RC circuit that conventionally provides delay time. A judgment and diverting circuit 332 identifies whether the detected fault is true in accordance with the counting result of the sub counter 326. If yes, a proper protection function 334, such as power-off, is conducted; otherwise, the normal operation 336 is recovered. The counting time generated by the sub counter 326 is longer than the required RC delay time so as to enhance the reliability of the verification. However, this PWM controller 300 still requires the detectors 310-316 to conduct detection functions. Also, for precisely distributing the proper clock to the main counter 324, the clock diverting 320 is typically implemented by extremely complex circuit. Therefore, less die area reduction can be achieved. As shown in FIG. 4, even if the oscillator 322 and frequency jittering 328 are grouped together, for example as a normal operation circuit, and the feedback open detector 310, overload detector 312, brownout detector 314 and optocoupler short detector 316 are grouped together, for example as a fault detection circuit 338, to simplify the clock diverting circuit 320, it may frequently happen that the transient or noise during normal operation detonates the fault detection circuit 338 and renders the main counter 324 to bypass the normal operation circuit and to disturb the frequency jittering 328, which consequently causes significant inconvenience of the use of the PWM controller 300.

SUMMARY OF THE INVENTION

An object of the present invention is to provide an apparatus and method for reducing the die area of a PWM controller.

Another object of the present invention is to provide an apparatus and method for preventing a PWM controller from suffering interference between the protection circuit and frequency jittering circuit thereof.

According to the present invention, an apparatus and method for reducing the die area of a PWM controller include extracting a fault index signal from the PWM controller to signal a fault event, and triggering a protection function by a protection circuit according to a low frequency clock and the fault index signal.

Specifically, the present invention provides an approach to reduce cost and maintains functions of a PWM controller. Since the protection function is triggered by monitoring the low frequency clock and fault index signal, there will be no need of any fault detection circuits and complex clock diverting circuit. Furthermore, because the protection circuit can be completely separated from the frequency jittering circuit, both of them can operate independently from mutual interference. Thereupon, the circuit is simplified, and the die area and cost of the PWM controller are reduced.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
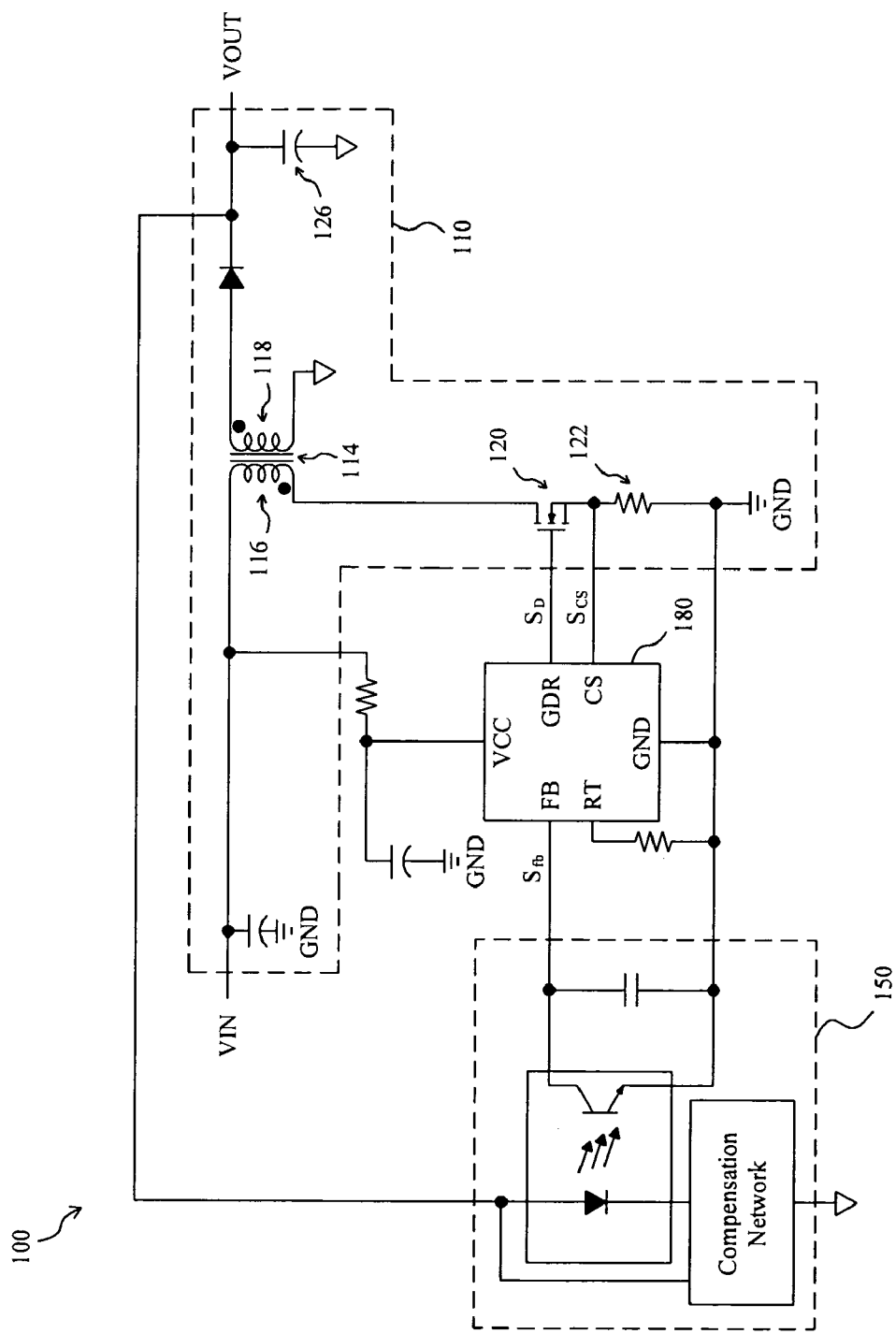
FIG. 1 is a typical flyback converter.
Figure 2:
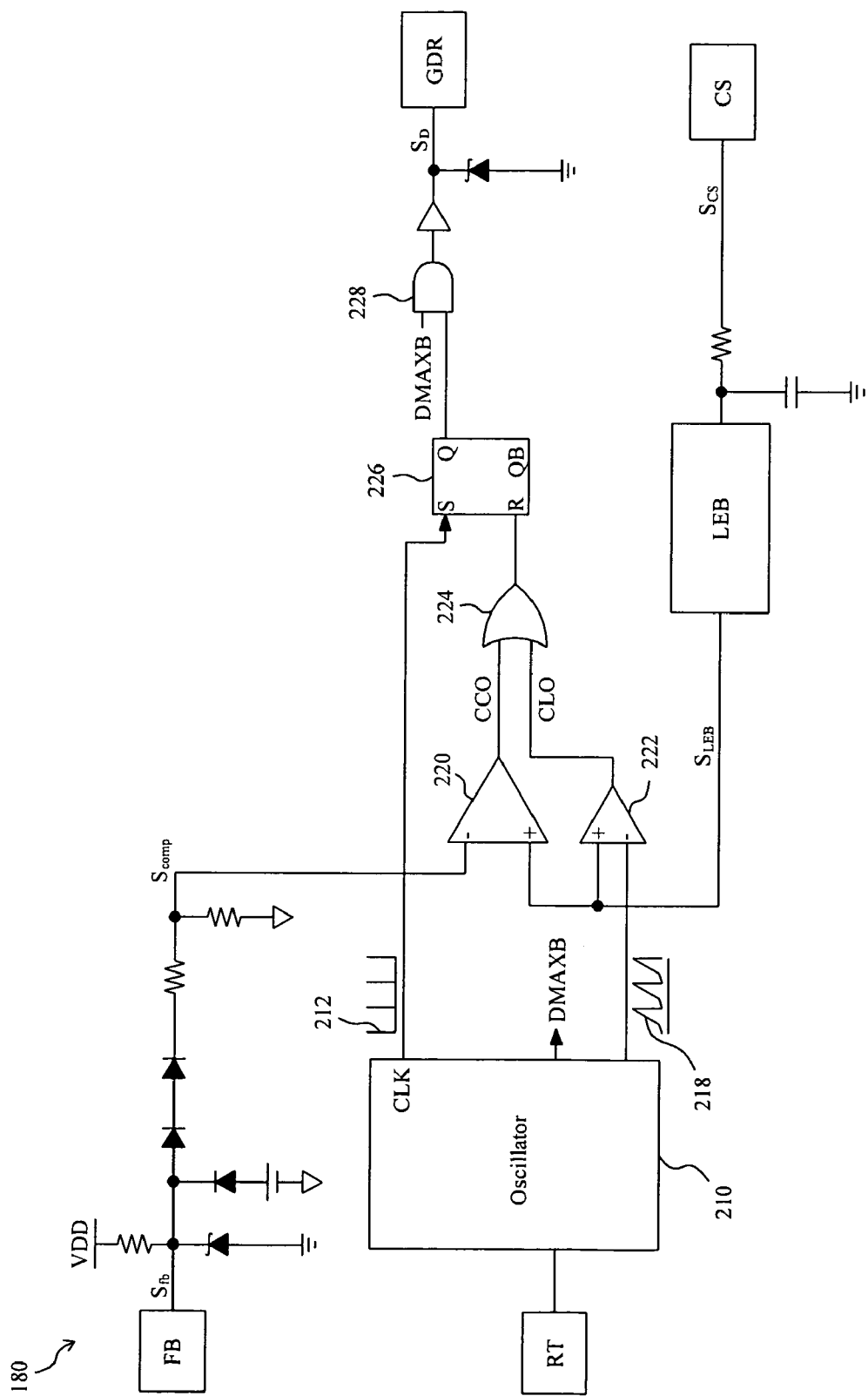
FIG. 2 shows a portion of the circuit inside the PWM controller of FIG. 1.
Figure 3:
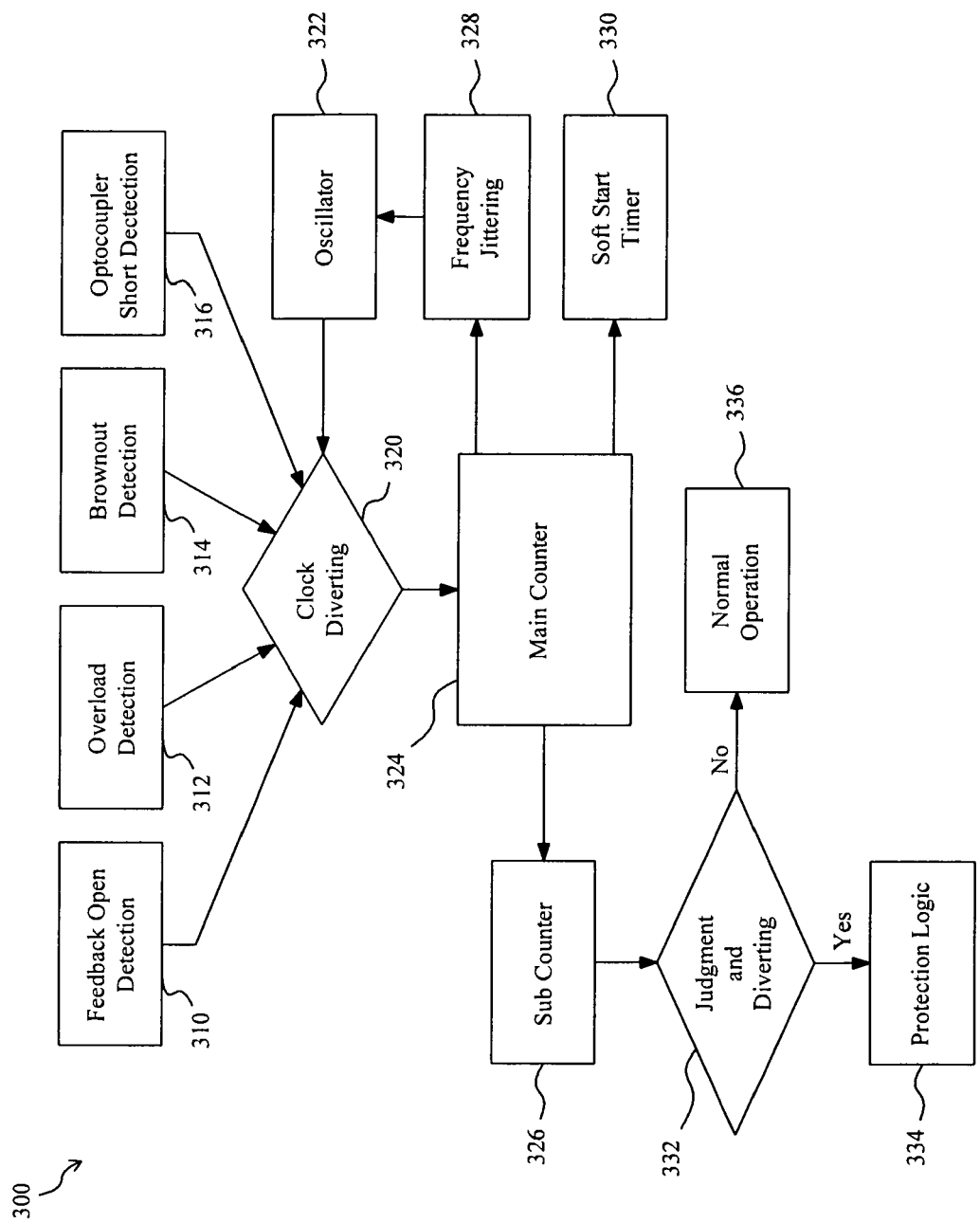
FIG. 3 is a system diagram of a conventional PWM controller.
Figure 4:
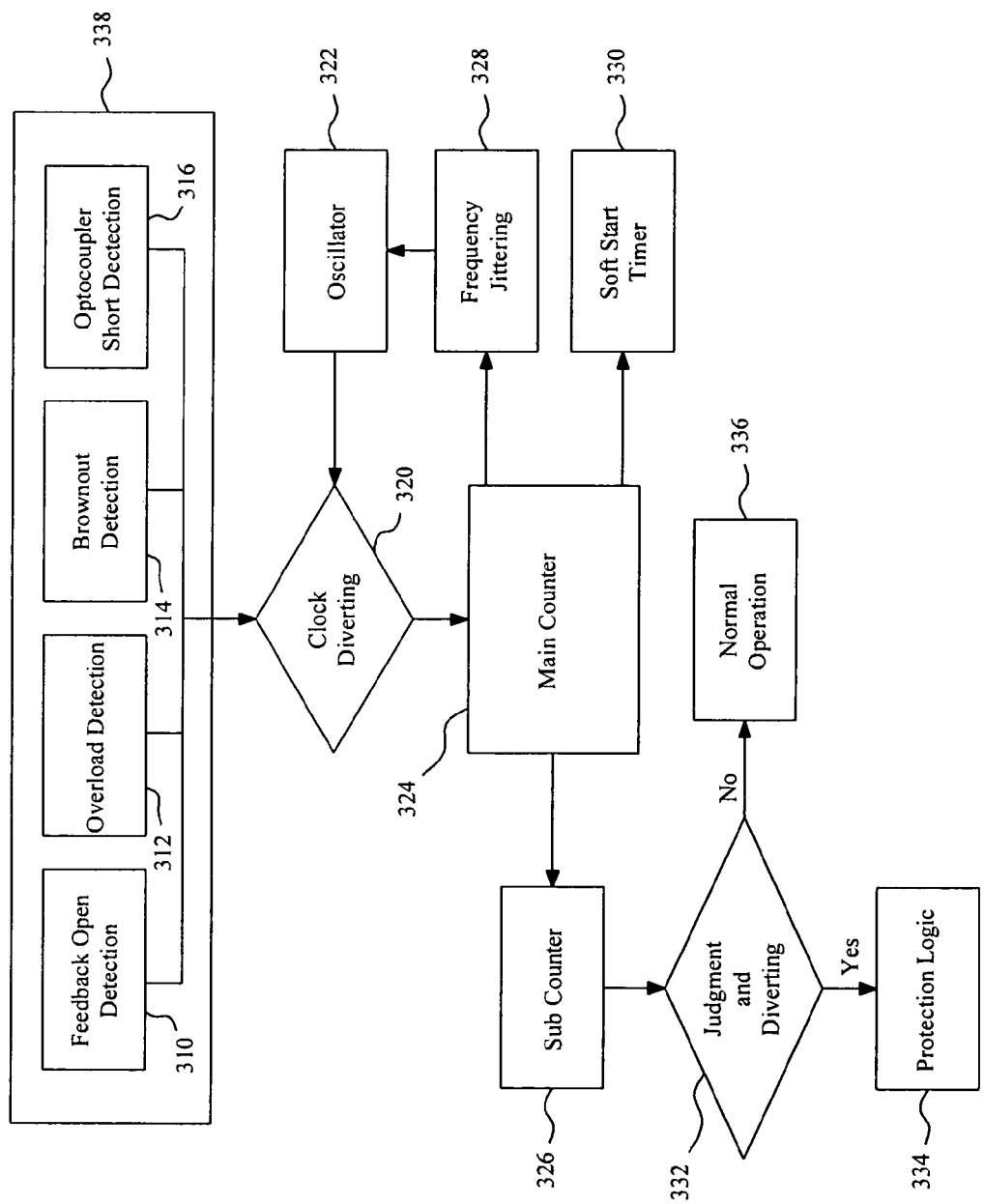
FIG. 4 is a system diagram of a conventional PWM controller.

It can be learned from FIGS. 1 and 2 that the PWM controller 180 generates the maximum duty limit DMAXB and signals CCO and CLO according to the status of the flyback converter 100 for the control of the switch 120. Under normal operation of the flyback converter 100, the PWM controller 180 generates the PWM signal $S_D$ according to the current comparator output CCO to switch the switch 120; while fault occurs, the current comparator output CCO vanishes and the PWM controller 180 generates the PWM signal $S_D$ according to the current limiting output CLO or the maximum duty limit DMAXB instead to switch the switch 120. In other words, the current comparator output CCO can be selected as a fault index signal among all faults and as long as the current comparator output CCO appears, that means no fault occurring.

Figure 5:
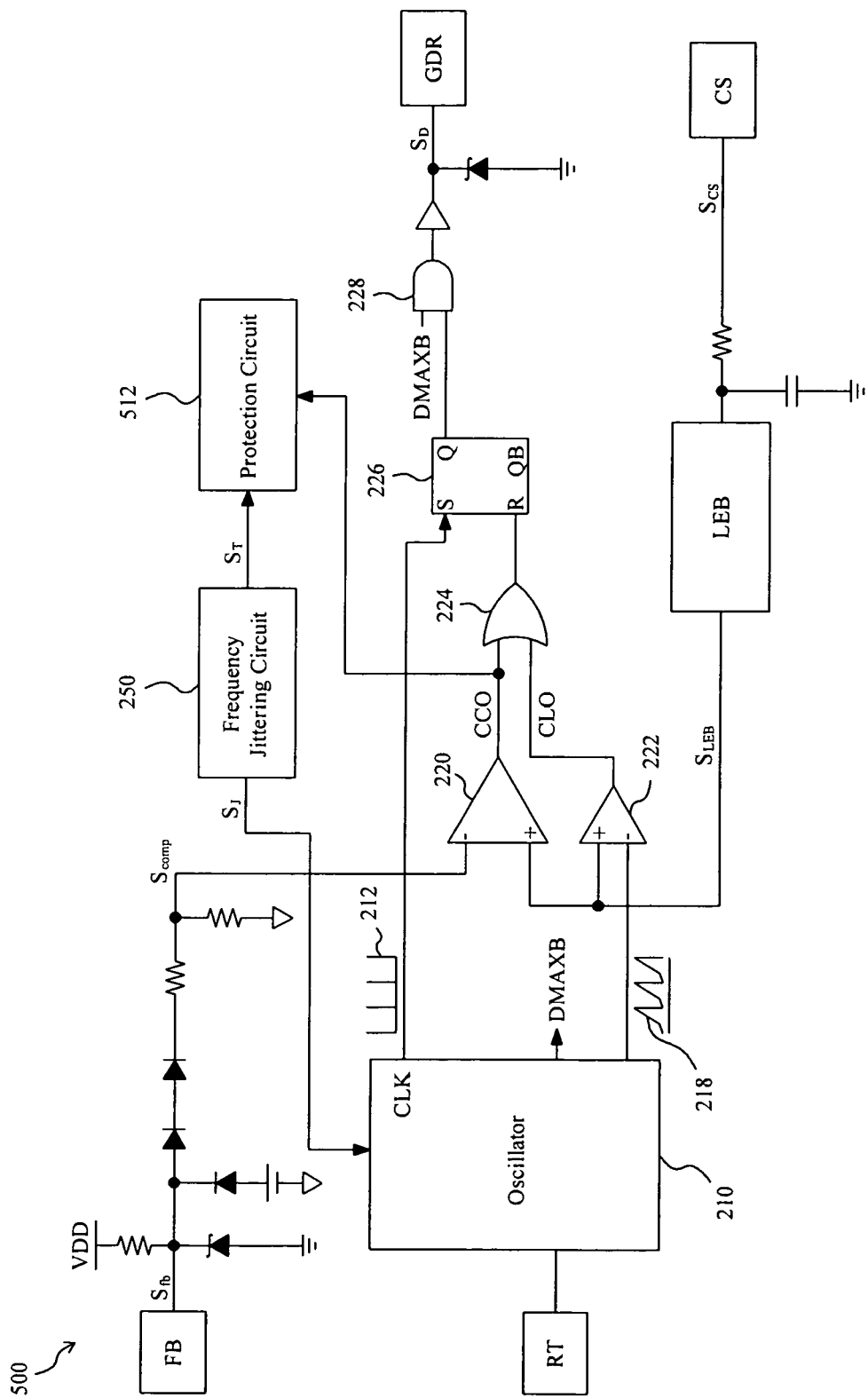
FIG. 5 is a PWM controller according to the present invention.

Accordingly, FIG. 5 provides a PWM controller 500 with the same configuration as that of FIG. 2 and, dissimilarly, having the current comparator output CCO as a fault index signal. A frequency jittering circuit 250 generates a clock $S_T$ and a frequency jittering signal $S_J$, a protection circuit 512 determines whether to trigger a protection function such as power-off, according to the clock $S_T$ and the fault index signal CCO, and an oscillator 210 maintains a frequency jittering function according to the frequency jittering signal $S_J$.

Figure 6:
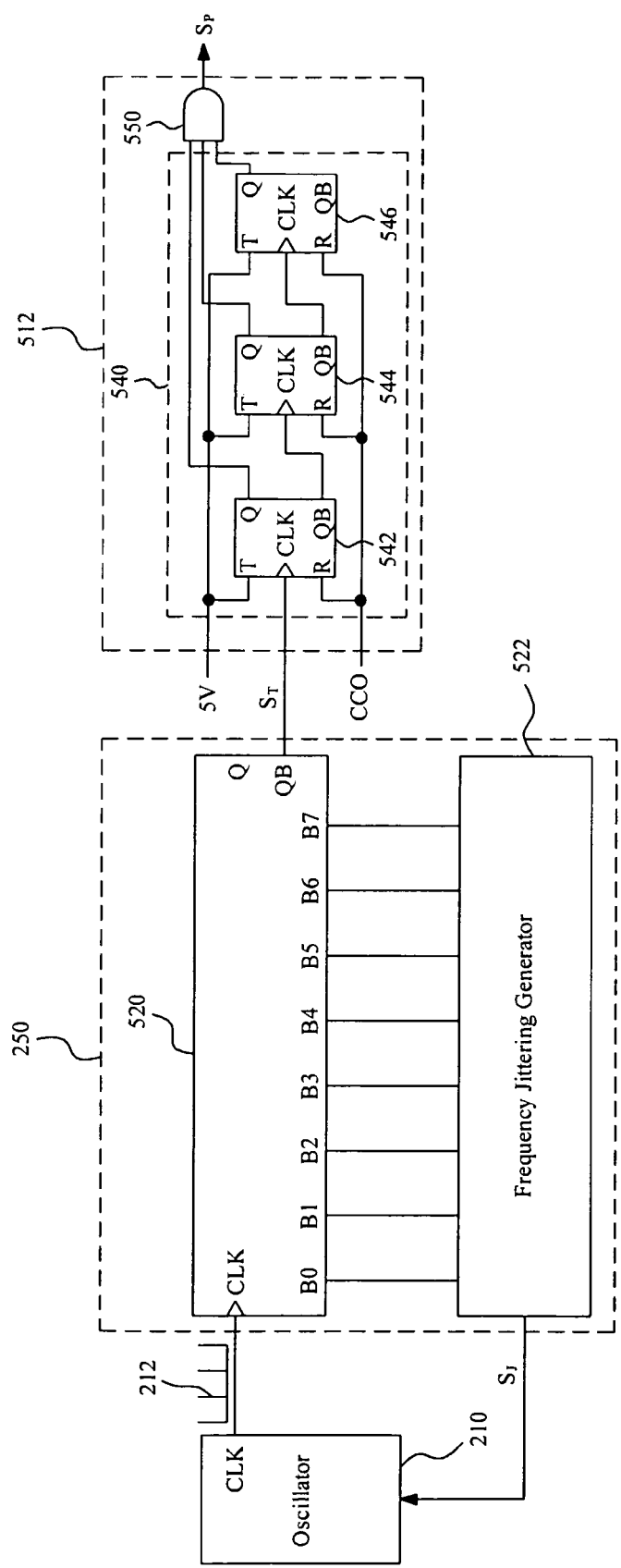
FIG. 6 is an embodiment of a digital frequency jittering circuit according to the present invention.

FIG. 6 provides an embodiment of the frequency jittering circuit 250 implemented with a digital circuit, which has a counter 520, for example an 8-bit counter, to count a clock 212 generated by the oscillator 210, and a frequency jittering generator 522 to generate the frequency jittering signal $S_J$ for the oscillator 210 according to the bits B0 to B7 of the counter 520 so as to achieve the frequency jittering function. Since the frequency jittering is implemented by counter, this counter could be used to do more functions to save die area of the PWM controller 500. The protection circuit 512 has a counter 540, for example a 3-bit counter, acting as a downstream of the counter 520, and a judgment circuit 550 to assert a protection signal $S_P$ according to the output of the counter 520. After being reset by the fault index signal CCO, the counter 540 counts the low-frequency clock $S_T$, which may have a frequency equal to that of the frequency jittering envelop, to generate a signal having a frequency lower than that of the frequency jittering envelop so as to provide a longer counting time. In this embodiment, the judgment circuit 550 is an AND gate; however, other logic circuits may be used instead for the same purpose. In this embodiment, the counter 540 is constructed with a string of T flip-flops 542, 544 and 546, whose inputs T are all coupled to a high voltage, e.g. 5V, and reset inputs R all receive the fault index signal CCO. The clock input CLK of each of the T flip-flops 542, 544 and 546 is coupled to the output of its previous stage, namely, the clock inputs CLK of the T flip-flops 542, 544 and 546 are coupled to the outputs QB of the counter 520, the T flip-flop 542 and the T flip-flop 544, respectively. The inputs of the judgment circuit 550 are coupled to the outputs Q of the T flip-flops 542, 544 and 546 so as to determine the protection signal $S_P$. In other embodiments, the counter 540 may have more T flip-flops for longer time delay. As shown in this embodiment, the big counter for implementing the frequency jittering is shared for other longer time constant functions.

Figure 7:
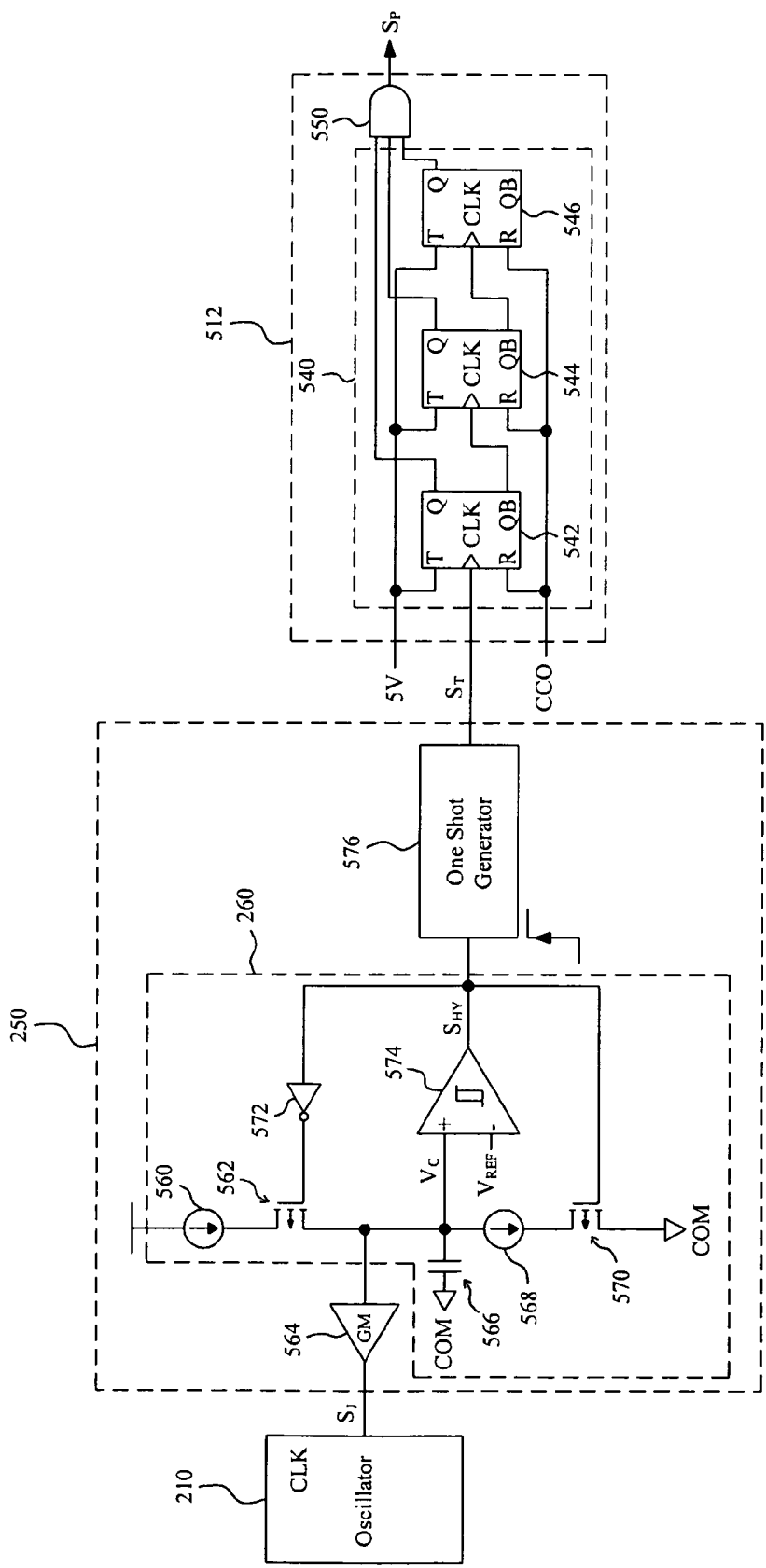
FIG. 7 is an embodiment of an analog frequency jittering circuit according to the present invention.
Figure 8:
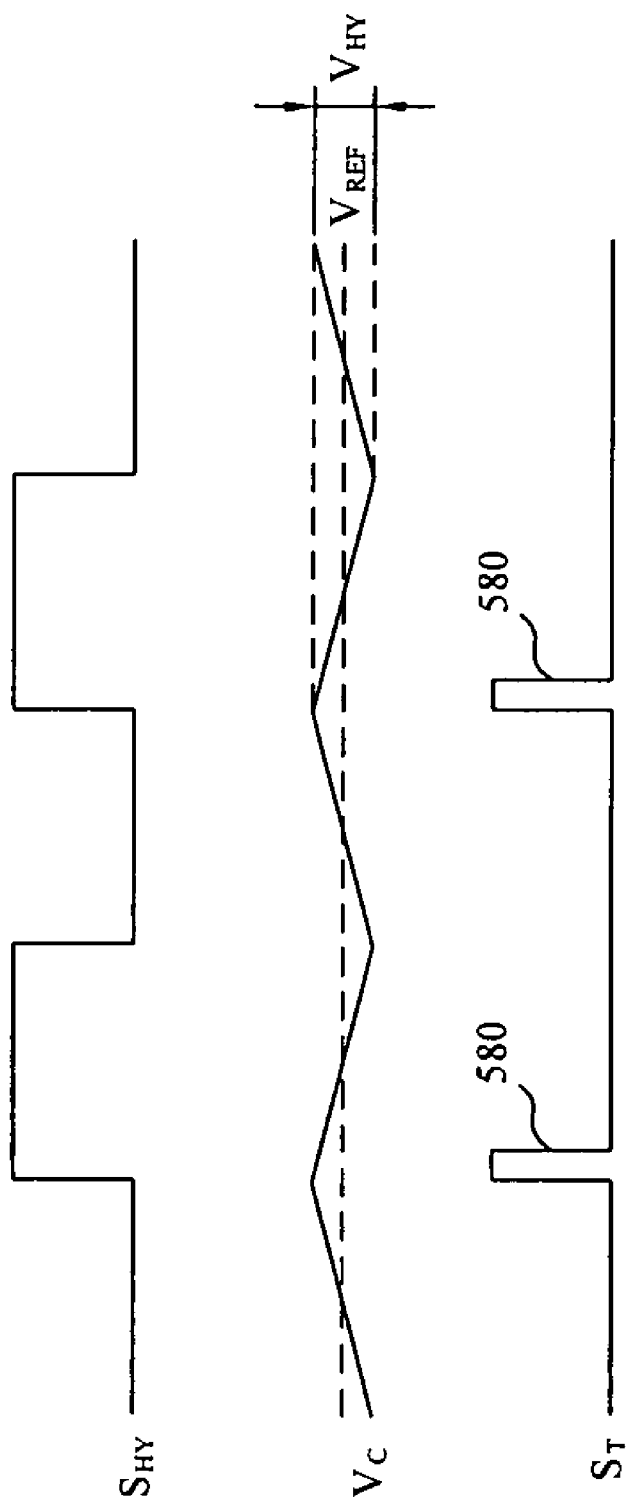
FIG. 8 is a waveform diagram of the circuit of FIG. 7.

Alternatively, as shown in FIG. 7, the low-frequency clock $S_T$ is generated by a low-frequency triangular-wave generator 260 of an analog frequency jittering circuit and in this case, the frequency jittering circuit 250 further includes a one shot generator 576 and a transconductive amplifier 564. FIG. 8 is a waveform diagram of the circuit of FIG. 7. Referring to FIGS. 7 and 8, the triangular-wave generator 260 has a current source 560 to charge a capacitor 566, a switch 562 coupled between the current source 560 and the capacitor 566, a switch 570 coupled between the capacitor 566 and a common terminal COM, a current source 568 coupled between the capacitor 566 and switch 570 to discharge the capacitor 566, a hysteretic comparator 574 to generate a hysteretic signal $S_{HY}$ by comparing the voltage $V_C$ on the capacitor 566 and a reference voltage $V_{REF}$, and an inverter 572 coupled between the output $S_{HY}$ of the hysteretic comparator 574 and the switch 562. The switches 562 and 570 are controlled by the hysteretic signal $S_{HY}$ to charge or discharge the capacitor 566, such that the voltage $V_C$ on the capacitor 566 oscillates with a low frequency, e.g. 4 ms period, and has a triangular waveform. When the hysteretic signal $S_{HY}$ is low, the switch 562 turns on and the switch 570 turns off, so that the capacitor 566 is charged. When the hysteretic signal $S_{HY}$ is high, the switch 562 turns off and the switch 570 turns on, so that the capacitor 566 is discharged. When the hysteretic signal $S_{HY}$ transits from low to high, in response thereto, the one shot generator 576 generates a pulse 580 for acting as the input clock $S_T$ for the protection circuit 512. The transconductive amplifier 564 generates a current from the voltage $V_C$ on the capacitance 566, for acting as the frequency jittering signal $S_J$ for the oscillator 210. In this embodiment, the switches 562 and 570 are MOS transistors, the reference voltage $V_{REF}$ is used as the center value of the switch voltage $V_{HY}$ of the hysteretic comparator 574, the capacitor 566 has a large capacitance, and the current sources 560 and 568 are small current sources.

As shown in FIGS. 5 to 7, the PWM controller 500 uses the counter 540 for the protection functions that needs long time for operation or verification. The counting time limit of the counter 540 replaces the time constant provided by RC circuits. When the PWM controller 500 is applied for an apparatus, such as a flyback converter, in normal operation, the frequency jittering circuit 250 generates the frequency jittering signal $S_J$ and clock $S_T$, the counter 540 is reset by the fault index signal CCO, and the oscillator 210 maintains the frequency jittering upon the frequency jittering signal $S_J$. However, if a fault event occurs, such as feedback open, overload, optocoupler short and brownout, the frequency jittering circuit 250 still generates the frequency jittering signal $S_J$ and clock $S_T$, and the oscillator 210 maintains the frequency jittering upon the frequency jittering signal $S_J$; while the fault index signal CCO vanishes and the counter 540 will count the clock $S_T$. If the fault remains for a preset time limit, the system will determine that the fault is true, and the protection signal $S_P$ will be asserted to trigger the corresponding protection function, such as power-off. Otherwise, if the fault vanishes before the preset time is up, the counter 540 will be reset by the fault index signal CCO again, and the system will return to normal operation. Since the fault index signal CCO vanishes when a fault event happens and resets the counter 540 when it is alive, no fault detection circuits and clock diverting circuit are needed, and no influence will be applied to the operation of the frequency jittering circuit. Therefore, the die area is reduced and the cost is lowered, without any interference between the frequency jittering and protection functions. In addition, because of the counter 540, it gains some extra benefit, such as more reliable protection functions, since a longer delay time may be provided.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. An apparatus for reducing the die area of a PWM controller, comprising:
   a comparator comparing a feedback signal with a current sense signal to generate a fault index signal;
   a frequency jittering circuit independently generating a low-frequency clock signal; and
   a protection circuit receiving, at respective inputs thereof, said fault index signal and said low-frequency clock signal, and operative to trigger a protection function according to said low-frequency clock signal and said fault index signal;
   wherein the fault index signal signals a fault event.

2. The apparatus of claim 1, wherein the protection circuit comprises:
   a counter for counting the low-frequency clock signal after it is reset by the fault index signal, wherein said counter includes a counting time limit; and
   a judgment circuit generating a protection signal when a counting time of said low-frequency clock signal in said counter reaches said counting time limit.

3. The apparatus of claim 2, wherein the judgment circuit comprises an AND gate for producing the protection signal according to an output of the counter.

4. The apparatus of claim 2, wherein the counter comprises a T flip-flop string configured as a counting circuit.

5. A method for reducing the die area of a PWM controller, comprising the steps of:
   comparing a feedback signal with a current sense signal to generate a fault index signal, said fault index signal signaling a fault event;
   generating a low-frequency clock signal at a frequency jittering circuit:
   coupling said low-frequency clock signal to a protection circuit;
   counting said low-frequency clock signal at said protection circuit after said fault index signal transits from a first state to a second state; and
   generating a protection signal when said fault event lasts for a preset time limit, for triggering a protection function.

* * * * *